United States Patent
Hu et al.

(10) Patent No.: US 10,448,359 B2
(45) Date of Patent: Oct. 15, 2019

(54) METHOD AND APPARATUS FOR PAGING USER EQUIPMENT

(71) Applicant: Huawei Technologies Co., Ltd., Shenzhen (CN)

(72) Inventors: Zhenxing Hu, Shenzhen (CN); Wei Quan, Beijing (CN); Xiaodong Yang, Beijing (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/080,998

(22) Filed: Mar. 25, 2016

(65) Prior Publication Data

US 2016/0212727 A1 Jul. 21, 2016

Related U.S. Application Data

(63) Continuation of application No. PCT/CN2013/084434, filed on Sep. 27, 2013.

(51) Int. Cl.
*H04W 68/02* (2009.01)
*H04W 4/08* (2009.01)

(52) U.S. Cl.
CPC .......... *H04W 68/02* (2013.01); *H04W 4/08* (2013.01)

(58) Field of Classification Search
CPC ....... H04W 4/00; H04W 68/00; H04W 68/02; H04W 68/025; H04W 4/08; H04W 4/005
See application file for complete search history.

(56) References Cited

U.S. PATENT DOCUMENTS

| 8,929,927 B1 * | 1/2015 | Oroskar ................ H04W 68/02 370/352 |
| 2003/0103479 A1 | 6/2003 | Anderson et al. |
| 2009/0303953 A1 | 12/2009 | Kang et al. |
| 2010/0178942 A1 | 7/2010 | Laroia et al. |

(Continued)

FOREIGN PATENT DOCUMENTS

| CN | 102118859 A | 7/2011 |
| CN | 102202394 A | 9/2011 |

(Continued)

OTHER PUBLICATIONS

"Coverage enhancement for physical channels and signals for low-cost MTC," 3GPP TSG RAN WG1 Meeting #72, R1-130017, pp. 1-9, St. Julian's, Malta, 3rd Generation Partnership Project, Valbonne, France (Jan. 28-Feb. 1, 2013).

(Continued)

*Primary Examiner* — Ernest G Tacsik
(74) *Attorney, Agent, or Firm* — Leydig, Voit & Mayer, Ltd.

(57) ABSTRACT

Embodiments of the present disclosure provide a method and an apparatus for paging a user equipment. A paging message sent by an MME is received, where the foregoing paging message includes indication information of a UE type; a scheduling resource for sending a paging message of the foregoing UE type is determined according to the indication information of the UE type; and the paging message of the foregoing UE is sent on the scheduling resource, thereby reducing impact on a conventional type of UE that is caused by a limitation on a bandwidth of a received signal of a special type of UE.

12 Claims, 5 Drawing Sheets

(56) References Cited

U.S. PATENT DOCUMENTS

| | | |
|---|---|---|
| 2012/0076085 A1 | 3/2012 | Chou |
| 2013/0083753 A1 | 4/2013 | Lee et al. |
| 2013/0121303 A1* | 5/2013 | Cho .................. H04W 74/0833 370/329 |
| 2013/0136072 A1* | 5/2013 | Bachmann .............. H04W 4/00 370/329 |
| 2013/0184013 A1 | 7/2013 | Chao et al. |

FOREIGN PATENT DOCUMENTS

| | | |
|---|---|---|
| CN | 102256340 A | 11/2011 |
| CN | 102448167 A | 5/2012 |
| CN | 102655658 A | 9/2012 |
| CN | 102761826 A | 10/2012 |
| RU | 2316147 C2 | 1/2008 |
| RU | 2492576 C2 | 9/2013 |
| WO | 2011084024 A2 | 7/2011 |
| WO | 2011099753 A2 | 8/2011 |

OTHER PUBLICATIONS

"3$^{rd}$ Generation Partnership Project; Technical Specification Group Radio Access Network; Evolved Universal Terrestrial Radio Access (E-UTRA); Radio Resource Control (RRC); Protocol Specification (Release 11)," 3GPP TS 36.331, V11.5.0, pp. 1-347, 3$^{rd}$ Generation Partnership Project, Valbonne, France (Sep. 2013).

"3$^{rd}$ Generation Partnership Project Technical Specification Group Radio Access Network; Evolved Universal Terrestrial Radio Access Network (E-UTRAN); 51 Application Protocol (S1AP) (Release 11)," 3GPP TS 36.413, V11.5.0, pp. 1-274, 3$^{rd}$ Generation Partnership Project, Valbonne, France (Sep. 2013).

Wang et al.,"Paging Message and Monitoring Algorithm in LTE",Modem Science and Technology of Telecommunications (Oct. 2009).

* cited by examiner

US 10,448,359 B2

METHOD AND APPARATUS FOR PAGING USER EQUIPMENT

CROSS-REFERENCE

This application is a continuation of International Patent Application No. PCT/CN2013/084434, filed on Sep. 27, 2013, which is hereby incorporated by reference in its entirety.

TECHNICAL FIELD

Embodiments of the present disclosure relate to communications technologies, and in particular, to a method and an apparatus for paging a user equipment.

BACKGROUND

In a Long Term Evolution (LTE) system, a paging message is mapped to a physical downlink shared channel (PDSCH) for sending. A user equipment (UE) calculates a paging frame (PF) and a paging opportunity (PO) by using an international mobile subscriber identity (IMSI); determines, by listening in the subframe corresponding to the PO of the PF, whether there is a physical downlink control channel (PDCCH) that is scrambled by using a paging radio network temporary identifier (P-RNTI); and if there is a PDCCH that is scrambled by using the paging radio network temporary identifier, acquires scheduling resource information in the PO subframe of the PF, and then receives the PDSCH on a corresponding scheduling resource and acquires the paging message.

A low cost machine type communication (LC-MTC) device is a special type of UE. Compared with a common UE, this special type of UE has a lower cost. However, this special type of UE can receive baseband data only within a bandwidth of 1.4 M (corresponding to a PDSCH). In the conventional art, when paging this special type of UE, a base station can schedule a paging message only within the bandwidth of 1.4 M, so that this special type of UE can normally receive the paging message.

However, by using the method in the conventional art, a paging message is scheduled within the limited bandwidth of 1.4 M, so that a capacity of the paging message is limited, thereby affecting a conventional UE.

SUMMARY

Embodiments of the present disclosure provide a method and an apparatus for paging a user equipment, to reduce impact caused by a special type of UE on a conventional UE.

According to a first aspect, an embodiment of the present disclosure provides a method for paging a user equipment, including:

receiving a paging message sent by a mobility management entity (MME), where the paging message includes indication information of a user equipment (UE) type;

determining, according to the indication information of the UE type, a scheduling resource for sending a paging message of the UE type; and sending the paging message of the UE type on the scheduling resource.

With reference to the first aspect, in a first possible implementation manner, if the indication information of the UE type indicates a first type of UE, and a maximum bandwidth of a received signal of the first type of UE is a preset value, the determining, according to the indication information of the UE type, a scheduling resource for sending a paging message of the UE type includes:

determining, by using a discontinuous reception (DRX) period of the first type of UE, a first paging frame (PF) and a first paging opportunity (PO) for sending a paging message of the first type of UE; and mapping, according to a first mapping relationship, a subframe corresponding to the first PO to a subframe corresponding to a second PO, where at least one subframe of the subframe corresponding to the first PO is different from a subframe of the subframe corresponding to the second PO in the first mapping relationship; and the sending the paging message of the UE type on the scheduling resource includes:

sending the paging message of the first type of UE in the subframe corresponding to the second PO of the first PF.

With reference to the first possible implementation manner, in a second possible implementation manner, the method further includes: updating the first mapping relationship at an interval of a preset time period.

With reference to the first aspect, in a third possible implementation manner, if the indication information of the UE type indicates that the UE is a first type of UE, and a maximum bandwidth of a received signal of the first type of UE is a preset value, the determining, according to the indication information of the UE type, a scheduling resource for sending a paging message of the UE type includes:

determining, by using a discontinuous reception (DRX) period of the first type of UE, a first PF and a first PO of a paging message of the first type of UE, where the DRX period of the first type of UE is N times as long as a DRX period of a second type of UE, N is an integer greater than 1, and a maximum bandwidth of a received signal of the second type of UE is greater than the maximum bandwidth of a received signal of the first type of UE; and the sending the paging message of the first type of UE on the scheduling resource includes:

transmitting the paging message of the first type of UE in a subframe corresponding to the first PO of the first PF.

With reference to the first aspect, in a fourth possible implementation manner, the sending the paging message of the UE type on the scheduling resource includes:

scrambling, in a non-paging radio network temporary identifier (non-P-RNTI) scrambling manner, a physical downlink control channel (PDCCH) that carries scheduling resource information of a first type of UE, where a P-RNTI scrambling manner is a scrambling manner used by a PDCCH that carries scheduling resource information of a second type of UE, and a maximum bandwidth of a received signal of the second type of UE is greater than a maximum bandwidth of a received signal of the first type of UE; and sending a paging message of the first type of UE on a scheduling resource corresponding to the scheduling resource information carried in the PDCCH that is scrambled in the non-P-RNTI scrambling manner.

With reference to the first aspect, in a fifth possible implementation manner, the sending the paging message of the UE type on the scheduling resource includes: carrying scheduling resource information of a first type of UE by using a PDCCH of a first downlink control information format, and sending a paging message of the first type of UE on a scheduling resource corresponding to the scheduling resource information of the first type of UE; and carrying scheduling resource information of a second type of UE by using a PDCCH of a second downlink control information format, and sending a paging message of the second type of UE on a scheduling resource corresponding to the scheduling resource information of the second type of UE;

where a maximum bandwidth of a received signal of the second type of UE is greater than a maximum bandwidth of a received signal of the first type of UE.

According to a second aspect, an embodiment of the present disclosure provides a method for paging a user equipment, including:

determining a scheduling resource of the user equipment (UE); and receiving a paging message on the scheduling resource.

With reference to the second aspect, in a first possible implementation manner, the determining a scheduling resource of the UE includes:

determining, by using a discontinuous reception (DRX) period, a first paging frame (PF) and a first paging opportunity (PO) for sending the paging message of the UE; and mapping, according to a first mapping relationship, a subframe corresponding to the first PO to a subframe corresponding to a second PO, where at least one subframe of the subframe corresponding to the first PO is different from a subframe of the subframe corresponding to the second PO in the first mapping relationship; and the receiving a paging message on the scheduling resource includes:

receiving the paging message in the subframe corresponding to the second PO of the first PF.

With reference to the first possible implementation manner, in a second possible implementation manner, the first mapping relationship is updated at an interval of a preset time period.

With reference to the second aspect, in a third possible implementation manner, the determining a scheduling resource of the user equipment (UE) includes:

determining, by using a discontinuous reception (DRX) period of a first type of UE, a first PF and a first PO for sending the paging message, where the DRX period of the first type of UE is N times as long as a DRX period of a second type of UE, N is an integer greater than 1, and a maximum bandwidth of a received signal of the second type of UE is greater than a maximum bandwidth of a received signal of the first type of UE; and the receiving a paging message on the scheduling resource includes:

receiving the paging message in a subframe corresponding to the first PO of the first PF.

With reference to the second aspect, in a fourth possible implementation manner, the receiving a paging message on the scheduling resource includes:

determining, by using a DRX period, a first PF and a first PO for sending the paging message of the UE;

listening on, in a subframe corresponding to the first PO, a physical downlink control channel (PDCCH) that uses a non-paging radio network temporary identifier (non-P-RNTI) scrambling manner;

acquiring scheduling resource information from the PDCCH; and receiving the paging message on a scheduling resource corresponding to the scheduling resource information.

With reference to the second aspect, in a fifth possible implementation manner, the receiving a paging message on the scheduling resource includes:

determining, by using a DRX period, a first PF and a first PO for sending the paging message of the UE;

acquiring, in a subframe corresponding to the first PO, scheduling resource information carried by using a PDCCH of a first downlink control information format; and receiving the paging message on a scheduling resource corresponding to the scheduling resource information.

According to a third aspect, an embodiment of the present disclosure provides a method for paging a user equipment, including:

receiving at least one first paging message sent by a mobility management entity (MME), where the first paging message carries an identifier of a to-be-paged user equipment (UE) and coverage enhancement requirement information of the to-be-paged UE;

grouping the to-be-paged UE in the at least one first paging message into at least one group according to the coverage enhancement requirement information in the at least one first paging message;

determining, for each of the group according to coverage enhancement requirement information of a to-be-paged UE in the group, a first quantity of repeated sending times for sending a second paging message to the UE in the group, where the second paging message carries an identifier of the to-be-paged UE in the group; and sending the second paging message according to the first quantity of repeated sending times.

With reference to the third aspect, in a first possible implementation manner, the coverage enhancement requirement information of the to-be-paged UE is a coverage enhancement level, a coverage enhancement value, or a second quantity of repeated sending times that is of the to-be-paged UE; and the determining, according to coverage enhancement requirement information of a to-be-paged UE in the group, a first quantity of repeated sending times for sending a second paging message to the UE in the group includes:

determining, according to a maximum coverage enhancement level, a maximum coverage enhancement value, or a maximum second quantity of repeated sending times that is of the to-be-paged UE in the group, the first quantity of repeated sending times for sending the second paging message to the to-be-paged UE in the group.

With reference to the third aspect or the first possible implementation manner, in a second possible implementation manner, the second paging message further includes dedicated access resource information, so that the to-be-paged UE in the second paging message accesses a network according to the dedicated access resource information.

According to a fourth aspect, an embodiment of the present disclosure provides a method for paging a user equipment, including:

acquiring coverage enhancement requirement information of a to-be-paged user equipment (UE); and sending a first paging message to a base station, where the first paging message carries an identifier of the to-be-paged UE and the coverage enhancement requirement information of the to-be-paged UE.

With reference to the fourth aspect, in a first possible implementation manner, the acquiring coverage enhancement requirement information of a to-be-paged UE includes:

receiving the coverage enhancement requirement information reported by the to-be-paged UE by using non-access stratum (NAS) signaling, where the coverage enhancement requirement information is a coverage enhancement level, a coverage enhancement value, or a second quantity of repeated sending times.

With reference to the fourth aspect, in a second possible implementation manner, the acquiring coverage enhancement requirement information of a to-be-paged UE includes:

receiving the coverage enhancement requirement information of the to-be-paged UE that is reported by the base station, where the coverage enhancement requirement information is a coverage enhancement level, a coverage enhancement value, or a second quantity of repeated sending times.

According to a fifth aspect, an embodiment of the present disclosure provides a method for paging a user equipment, including:

receiving at least one first paging message sent by a mobility management entity (MME), where the first paging message carries an identifier of a to-be-paged user equipment (UE) and coverage enhancement requirement information of the to-be-paged UE;

determining, according to the coverage enhancement requirement information in the at least one first paging message, a quantity of repeated sending times for sending a second paging message to the to-be-paged UE in the at least one first paging message, where the second paging message carries the identifier of the to-be-paged UE in the at least one first paging message; and sending the second paging message according to the quantity of repeated sending times.

According to a sixth aspect, an embodiment of the present disclosure provides an apparatus for paging a user equipment, including:

a receiving module, configured to receive a paging message sent by a mobility management entity (MME), where the paging message includes indication information of a user equipment (UE) type;

a processing module, configured to determine, according to the indication information of the UE type, a scheduling resource for sending a paging message of the UE type; and a sending module, configured to send the paging message of the UE type on the scheduling resource.

With reference to the sixth aspect, in a first possible implementation manner, if the indication information of the UE type indicates a first type of UE, and a maximum bandwidth of a received signal of the first type of UE is a preset value, the processing module is configured to determine, by using a discontinuous reception (DRX) period of the first type of UE, a first paging frame (PF) and a first paging opportunity (PO) for sending a paging message of the first type of UE; and map, according to a first mapping relationship, a subframe corresponding to the first PO to a subframe corresponding to a second PO, where at least one subframe of the subframe corresponding to the first PO is different from a subframe of the subframe corresponding to the second PO in the first mapping relationship; and the sending module is configured to send the paging message of the first type of UE in the subframe corresponding to the second PO of the first PF.

With reference to the first possible implementation manner, in a second possible implementation manner, the apparatus further includes:

updating the first mapping relationship at an interval of a preset time period.

With reference to the sixth aspect, in a third possible implementation manner, if the indication information of the UE type indicates that the UE is a first type of UE, and a maximum bandwidth of a received signal of the first type of UE is a preset value, the processing module is configured to determine, by using a discontinuous reception (DRX) period of the first type of UE, a first PF and a first PO of a paging message of the first type of UE, where the DRX period of the first type of UE is N times as long as a DRX period of a second type of UE, N is an integer greater than 1, and a maximum bandwidth of a received signal of the second type of UE is greater than the maximum bandwidth of a received signal of the first type of UE; and the sending module is configured to transmit the paging message of the first type of UE in a subframe corresponding to the first PO of the first PF.

With reference to the sixth aspect, in a fourth possible implementation manner, the sending module is configured to: scramble, in a non-paging radio network temporary identifier (non-P-RNTI) scrambling manner, a physical downlink control channel (PDCCH) that carries scheduling resource information of a first type of UE, where a P-RNTI scrambling manner is a scrambling manner used by a PDCCH that carries scheduling resource information of a second type of UE, and a maximum bandwidth of a received signal of the second type of UE is greater than a maximum bandwidth of a received signal of the first type of UE; and send a paging message of the first type of UE on a scheduling resource corresponding to the scheduling resource information carried in the PDCCH that is scrambled in the non-P-RNTI scrambling manner.

With reference to the sixth aspect, in a fifth possible implementation manner, the sending module is configured to: carry scheduling resource information of a first type of UE by using a PDCCH of a first downlink control information format, and send a paging message of the first type of UE on a scheduling resource corresponding to the scheduling resource information of the first type of UE; and carry scheduling resource information of a second type of UE by using a PDCCH of a second downlink control information format, and send a paging message of the second type of UE on a scheduling resource corresponding to the scheduling resource information of the second type of UE, where a maximum bandwidth of a received signal of the second type of UE is greater than a maximum bandwidth of a received signal of the first type of UE.

According to a seventh aspect, an embodiment of the present disclosure provides an apparatus for paging a user equipment, including:

a processing module, configured to determine a scheduling resource of the user equipment (UE); and a receiving module, configured to receive a paging message on the scheduling resource.

With reference to the seventh aspect, in a first possible implementation manner, the processing module is configured to:

determine, by using a discontinuous reception (DRX) period, a first paging frame (PF) and a first paging opportunity (PO) for sending the paging message of the UE; and map, according to a first mapping relationship, a subframe corresponding to the first PO to a subframe corresponding to a second PO, where at least one subframe of the subframe corresponding to the first PO is different from a subframe of the subframe corresponding to the second PO in the first mapping relationship; and the receiving module is configured to receive the paging message in the subframe corresponding to the second PO of the first PF.

With reference to the first possible implementation manner, in a second possible implementation manner, the apparatus further includes:

updating the first mapping relationship at an interval of a preset time period.

With reference to the seventh aspect, in a third possible implementation manner, the processing module is configured to: determine, by using a discontinuous reception (DRX) period of a first type of UE, a first PF and a first PO for sending the paging message, where the DRX period of the first type of UE is N times as long as a DRX period of a second type of UE, N is an integer greater than 1, and a maximum bandwidth of a received signal of the second type of UE is greater than a maximum bandwidth of a received signal of the first type of UE; and the receiving module is configured to receive the paging message in a subframe corresponding to the first PO of the first PF.

With reference to the seventh aspect, in a fourth possible implementation manner, the receiving module is configured to determine, by using a DRX period, a first PF and a first PO for sending the paging message of the UE; listen on, in a subframe corresponding to the first PO, a physical downlink control channel (PDCCH) that uses a non-paging radio network temporary identifier (non-P-RNTI) scrambling manner; acquire scheduling resource information from the PDCCH; and receive the paging message on a scheduling resource corresponding to the scheduling resource information.

With reference to the seventh aspect, in a fifth possible implementation manner, the receiving module is configured to determine, by using a DRX period, a first PF and a first PO for sending the paging message of the UE; acquire, in a subframe corresponding to the first PO, scheduling resource information carried by using a PDCCH of a first downlink control information format; and receive the paging message on a scheduling resource corresponding to the scheduling resource information.

According to an eighth aspect, an embodiment of the present disclosure provides an apparatus for paging a user equipment, including:

a receiving module, configured to receive at least one first paging message sent by a mobility management entity (MME), where the first paging message carries an identifier of a to-be-paged user equipment (UE) and coverage enhancement requirement information of the to-be-paged UE;

a first processing module, configured to group the to-be-paged UE in the at least one first paging message into at least one group according to the coverage enhancement requirement information in the at least one first paging message;

a second processing module, configured to determine, for each of the group according to coverage enhancement requirement information of a to-be-paged UE in the group, a first quantity of repeated sending times for sending a second paging message to the UE in the group, where the second paging message carries an identifier of the to-be-paged UE in the group; and a sending module, configured to send the second paging message according to the first quantity of repeated sending times.

With reference to the eighth aspect, in a first possible implementation manner, the coverage enhancement requirement information of the to-be-paged UE is a coverage enhancement level, a coverage enhancement value, or a second quantity of repeated sending times that is of the to-be-paged UE; and the second processing module is configured to determine, according to a maximum coverage enhancement level, a maximum coverage enhancement value, or a maximum second quantity of repeated sending times that is of the to-be-paged UE in the group, the first quantity of repeated sending times for sending the second paging message to the to-be-paged UE in the group.

With reference to the eighth aspect or the first possible implementation manner, in a second possible implementation manner, the second paging message further includes dedicated access resource information, so that the to-be-paged UE in the second paging message accesses a network according to the dedicated access resource information.

According to a ninth aspect, an embodiment of the present disclosure provides an apparatus for paging a user equipment, including:

an acquiring module, configured to acquire coverage enhancement requirement information of a to-be-paged user equipment (UE); and a sending module, configured to send a first paging message to a base station, where the first paging message carries an identifier of the to-be-paged UE and the coverage enhancement requirement information of the to-be-paged UE.

With reference to the ninth aspect, in a first possible implementation manner, the acquiring module is configured to receive the coverage enhancement requirement information reported by the to-be-paged UE by using non-access stratum (NAS) signaling, where the coverage enhancement requirement information is a coverage enhancement level, a coverage enhancement value, or a second quantity of repeated sending times.

With reference to the ninth aspect, in a second possible implementation manner, the acquiring module is configured to receive the coverage enhancement requirement information of the to-be-paged UE that is reported by the base station, where the coverage enhancement requirement information is a coverage enhancement level, a coverage enhancement value, or a second quantity of repeated sending times.

According to a tenth aspect, an embodiment of the present disclosure provides an apparatus for paging a user equipment, including:

a receiving module, configured to receive at least one first paging message sent by a mobility management entity (MME), where the first paging message carries an identifier of a to-be-paged user equipment (UE) and coverage enhancement requirement information of the to-be-paged UE;

a processing module, configured to determine, according to the coverage enhancement requirement information in the at least one first paging message, a quantity of repeated sending times for sending a second paging message to the to-be-paged UE in the at least one first paging message, where the second paging message carries the identifier of the to-be-paged UE in the at least one first paging message; and a sending module, configured to send the second paging message according to the quantity of repeated sending times.

According to an eleventh aspect, an embodiment of the present disclosure provides an apparatus for paging a user equipment, including:

a receiver, configured to receive a paging message sent by a mobility management entity (MME), where the paging message includes indication information of a user equipment (UE) type;

a processor, configured to determine, according to the indication information of the UE type, a scheduling resource for sending a paging message of the UE type; and a transmitter, configured to send the paging message of the UE type on the scheduling resource.

With reference to the eleventh aspect, in a first possible implementation manner, if the indication information of the UE type indicates a first type of UE, and a maximum bandwidth of a received signal of the first type of UE is a preset value, the processor is configured to determine, by using a discontinuous reception (DRX) period of the first type of UE, a first paging frame (PF) and a first paging opportunity (PO) for sending a paging message of the first type of UE; and map, according to a first mapping relationship, a subframe corresponding to the first PO to a subframe corresponding to a second PO, where at least one subframe of the subframe corresponding to the first PO is different from a subframe of the subframe corresponding to the second PO in the first mapping relationship; and the transmitter is configured to send the paging message of the first type of UE in the subframe corresponding to the second PO of the first PF.

With reference to the first possible implementation manner, in a second possible implementation manner, the apparatus further includes:

updating the first mapping relationship at an interval of a preset time period.

With reference to the eleventh aspect, in a third possible implementation manner, if the indication information of the UE type indicates that the UE is a first type of UE, and a maximum bandwidth of a received signal of the first type of UE is a preset value, the processor is configured to determine, by using a discontinuous reception (DRX) period of the first type of UE, a first PF and a first PO of a paging message of the first type of UE, where the DRX period of the first type of UE is N times as long as a DRX period of a second type of UE, N is an integer greater than 1, and a maximum bandwidth of a received signal of the second type of UE is greater than the maximum bandwidth of a received signal of the first type of UE; and the transmitter is configured to transmit the paging message of the first type of UE in a subframe corresponding to the first PO of the first PF.

With reference to the eleventh aspect, in a fourth possible implementation manner, the transmitter is configured to: scramble, in a non-paging radio network temporary identifier (non-P-RNTI) scrambling manner, a physical downlink control channel (PDCCH) that carries scheduling resource information of a first type of UE, where a P-RNTI scrambling manner is a scrambling manner used by a PDCCH that carries scheduling resource information of a second type of UE, and a maximum bandwidth of a received signal of the second type of UE is greater than a maximum bandwidth of a received signal of the first type of UE; and send a paging message of the first type of UE on a scheduling resource corresponding to the scheduling resource information carried in the PDCCH that is scrambled in the non-P-RNTI scrambling manner.

With reference to the eleventh aspect, in a fifth possible implementation manner, the transmitter is configured to: carry scheduling resource information of a first type of UE by using a PDCCH of a first downlink control information format, and send a paging message of the first type of UE on a scheduling resource corresponding to the scheduling resource information of the first type of UE; and carry scheduling resource information of a second type of UE by using a PDCCH of a second downlink control information format, and send a paging message of the second type of UE on a scheduling resource corresponding to the scheduling resource information of the second type of UE, where a maximum bandwidth of a received signal of the second type of UE is greater than a maximum bandwidth of a received signal of the first type of UE.

According to a twelfth aspect, an embodiment of the present disclosure provides an apparatus for paging a user equipment, including:

a processor, configured to determine a scheduling resource of the user equipment (UE); and a receiver, configured to receive a paging message on the scheduling resource.

With reference to the twelfth aspect, in a first possible implementation manner, the processor is configured to:

determine, by using a discontinuous reception (DRX) period, a first paging frame (PF) and a first paging opportunity (PO) for sending the paging message of the UE; and map, according to a first mapping relationship, a subframe corresponding to the first PO to a subframe corresponding to a second PO, where at least one subframe of the subframe corresponding to the first PO is different from a subframe of the subframe corresponding to the second PO in the first mapping relationship; and the receiver is configured to receive the paging message in the subframe corresponding to the second PO of the first PF.

With reference to the first possible implementation manner, in a second possible implementation manner, the apparatus further includes:

updating the first mapping relationship at an interval of a preset time period.

With reference to the twelfth aspect, in a third possible implementation manner, the processor is configured to: determine, by using a discontinuous reception (DRX) period of a first type of UE, a first PF and a first PO for sending the paging message, where the DRX period of the first type of UE is N times as long as a DRX period of a second type of UE, N is an integer greater than 1, and a maximum bandwidth of a received signal of the second type of UE is greater than a maximum bandwidth of a received signal of the first type of UE; and the receiver is configured to receive the paging message in a subframe corresponding to the first PO of the first PF.

With reference to the twelfth aspect, in a fourth possible implementation manner, the receiver is configured to determine, by using a DRX period, a first PF and a first PO for sending the paging message of the UE; listen on, in a subframe corresponding to the first PO, a physical downlink control channel (PDCCH) that uses a non-paging radio network temporary identifier (non-P-RNTI) scrambling manner; acquire scheduling resource information from the PDCCH; and receive the paging message on a scheduling resource corresponding to the scheduling resource information.

With reference to the twelfth aspect, in a fifth possible implementation manner, the receiver is configured to determine, by using a DRX period, a first PF and a first PO for sending the paging message of the UE; acquire, in a subframe corresponding to the first PO, scheduling resource information carried by using a PDCCH of a first downlink control information format; and receive the paging message on a scheduling resource corresponding to the scheduling resource information.

According to a thirteenth aspect, an embodiment of the present disclosure provides an apparatus for paging a user equipment, including:

a receiver, configured to receive at least one first paging message sent by a mobility management entity (MME), where the first paging message carries an identifier of a to-be-paged user equipment (UE) and coverage enhancement requirement information of the to-be-paged UE;

a processor, configured to: group the to-be-paged UE in the at least one first paging message into at least one group according to the coverage enhancement requirement information in the at least one first paging message; and determine, for each of the group according to coverage enhancement requirement information of a to-be-paged UE in the group, a first quantity of repeated sending times for sending a second paging message to the UE in the group, where the second paging message carries an identifier of the to-be-paged UE in the group; and a transmitter, configured to send the second paging message according to the first quantity of repeated sending times.

With reference to the thirteenth aspect, in a first possible implementation manner, the coverage enhancement requirement information of the to-be-paged UE is a coverage enhancement level, a coverage enhancement value, or a second quantity of repeated sending times that is of the to-be-paged UE; and the processor is configured to determine, according to a maximum coverage enhancement level, a maximum coverage enhancement value, or a maximum second quantity of repeated sending times that is of the to-be-paged UE in the group, the first quantity of repeated sending times for sending the second paging message to the to-be-paged UE in the group.

With reference to the thirteenth aspect or the first possible implementation manner, in a second possible implementation manner, the second paging message further includes dedicated access resource information, so that the to-be-paged UE in the second paging message accesses a network according to the dedicated access resource information.

According to a fourteenth aspect, an embodiment of the present disclosure provides an apparatus for paging a user equipment, including:

an acquirer, configured to acquire coverage enhancement requirement information of a to-be-paged user equipment (UE); and a transmitter, configured to send a first paging message to a base station, where the first paging message carries an identifier of the to-be-paged UE and the coverage enhancement requirement information of the to-be-paged UE.

With reference to the fourteenth aspect, in a first possible implementation manner, the acquirer is configured to receive the coverage enhancement requirement information reported by the to-be-paged UE by using non-access stratum (NAS) signaling, where the coverage enhancement requirement information is a coverage enhancement level, a coverage enhancement value, or a second quantity of repeated sending times.

With reference to the fourteenth aspect, in a second possible implementation manner, the acquirer is configured to receive the coverage enhancement requirement information of the to-be-paged UE that is reported by the base station, where the coverage enhancement requirement information is a coverage enhancement level, a coverage enhancement value, or a second quantity of repeated sending times.

According to a fifteenth aspect, an embodiment of the present disclosure provides an apparatus for paging a user equipment, including:

a receiver, configured to receive at least one first paging message sent by a mobility management entity (MME), where the first paging message carries an identifier of a to-be-paged user equipment (UE) and coverage enhancement requirement information of the to-be-paged UE;

a processor, configured to determine, according to the coverage enhancement requirement information in the at least one first paging message, a quantity of repeated sending times for sending a second paging message to the to-be-paged UE in the at least one first paging message, where the second paging message carries the identifier of the to-be-paged UE in the at least one first paging message; and a transmitter, configured to send the second paging message according to the quantity of repeated sending times.

According to the method and the apparatus for paging a user equipment that are provided in the embodiments of the present disclosure, a paging message sent by an MME is received, where the foregoing paging message includes indication information of a UE type; a scheduling resource for sending a paging message of the foregoing UE type is determined according to the indication information of the UE type; and the paging message of the foregoing UE is sent on the foregoing scheduling resource, thereby reducing impact on a conventional type of UE that is caused by a limitation on a bandwidth of a received signal of a special type of UE.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the present disclosure, a special type of UE whose received signal bandwidth is limited to a first range (such as a range of 1.4 M) is referred to as a first type of UE, and a conventional type of UE whose received signal bandwidth is not limited is referred to as a second type of UE. In the conventional art, the special type of UE and the conventional type of UE share a same scheduling resource to send a paging message, and therefore, bandwidth limitation of the special type of UE affects a size of a paging message and the conventional type of UE. In the present disclosure, to resolve the foregoing problem, a paging message of the conventional type of UE and a paging message of the special type of UE are sent on different scheduling resources, to avoid impact on the conventional type of UE that is caused by a limitation on a bandwidth of a received signal of the special type of UE.

The following describes in detail technical solutions of the present disclosure by using several specific embodiments.

Figure 1:
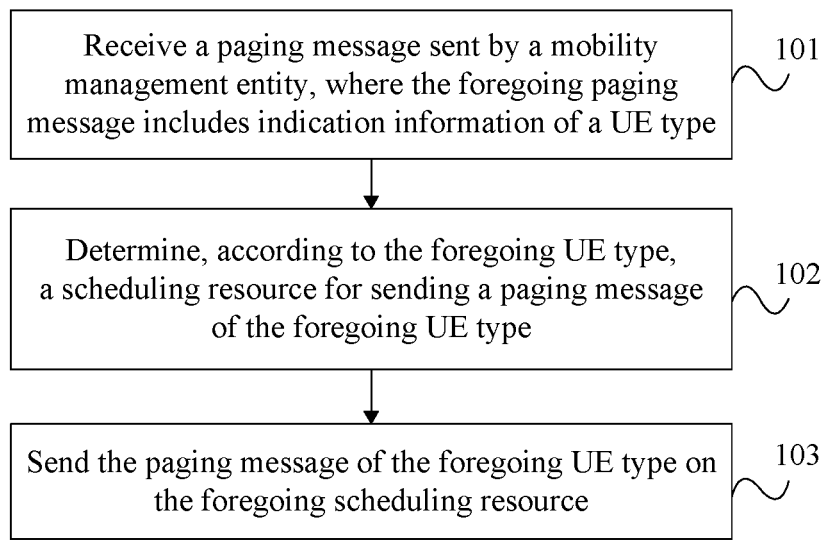
FIG. 1 is a schematic flowchart of Embodiment 1 of a method for paging a user equipment according to the present disclosure.

FIG. 1 is a schematic flowchart of Embodiment 1 of a method for paging a user equipment according to the present disclosure. As shown in FIG. 1, this embodiment is executed by a base station, and the method in this embodiment is as follows:

101[m11]. Receive a paging message sent by a mobility management entity, where the foregoing paging message includes indication information of a UE type.

The mobility management entity (Mobility Management Entity, MME) sends the paging message to the base station. The indication information of the UE type is used to indicate a UE type, and the UE type is a first type of UE or a second type of UE, where a maximum bandwidth of a received signal of the first type of UE is a preset value, for example, the preset value is 1.4 M, and the base station can send a paging message of the second type of UE only on a scheduling resource within a bandwidth of 1.4 M.

102. Determine, according to the foregoing UE type, a scheduling resource for sending a paging message of the foregoing UE type.

103. Send the paging message of the foregoing UE type on the foregoing scheduling resource.

If the UE type is the second type of UE (that is, a conventional type of UE), a scheduling resource for sending a paging message of the second type of UE is determined by using an existing method for determining a scheduling resource.

If the UE type is the first type of UE (that is, a special type of UE), a scheduling resource is determined in the following several implementation manners, to reduce or avoid impact caused by the special type of UE on the conventional UE.

In a first implementation manner, a first paging frame (PF) and a first paging opportunity (PO) for sending a paging message of the first type of UE are determined by using a discontinuous reception (DRX) period of the first type of UE. The first PF and the first PO that are determined by performing this step are the same as those of the conventional type of UE, where a determining result of the first PO is shown in Table 1.

TABLE 1

Table for a subframe corresponding to the first PO

| Ns | PO when $i\_s = 0$ | PO when $i\_s = 1$ | PO when $i\_s = 2$ | PO when $i\_s = 3$ |
|---|---|---|---|---|
| 1 | 9 | N/A | N/A | N/A |
| 2 | 4 | 9 | N/A | N/A |
| 4 | 0 | 4 | 5 | 9 |

Calculating the first PO is related to NS. When NS is 1, the first PO determines one subframe, that is, subframe 9. For the conventional UE, the paging message may be sent in subframe 9 of each first PF.

When NS is 2, the first PO determines two subframes, that is, subframe 4 and subframe 9. For the conventional UE, the paging message may be sent in subframe 4 or subframe 9 of each first PF.

When NS is 4, the first PO determines four subframes, that is, subframe 0, subframe 4, subframe 5, and subframe 9. For the conventional UE, the paging message may be sent in subframe 0, subframe 4, subframe 5, or subframe 9 of each first PF.

However, for the first type of UE, to reduce impact on a second type of UE, after the first PF and the first PO are determined, a subframe corresponding to the first PO is mapped, according to a first mapping relationship, to a subframe corresponding to a second PO. For example, the first mapping relationship is as follows: 4 is mapped to 0, and 9 is mapped to 5, and then a table for a subframe that is corresponding to the second PO and determined according to the foregoing first mapping relationship is as follows:

TABLE 2

Table for a subframe corresponding to the second PO

| Ns | PO when $i\_s = 0$ | PO when $i\_s = 1$ | PO when $i\_s = 2$ | PO when $i\_s = 3$ |
|---|---|---|---|---|
| 1 | 5 | N/A | N/A | N/A |
| 2 | 0 | 5 | N/A | N/A |
| 4 | 0 | 0 | 5 | 5 |

It can be learned by comparing Table 2 with Table 1 that, only when NS=4, the special UE may affect the conventional UE in subframe 0 and subframe 5, thereby reducing impact on the conventional UE to some extent.

To avoid continuous impact caused by keeping using the first mapping relationship on a conventional UE that listens on subframe 0 and subframe 5, the first mapping relationship may further be updated at an interval of a preset time period. The base station may notify the UE of the foregoing preset time period, so that both the UE and the base station update a first mapping relationship table according to the preset time period; or the preset time period may be directly configured in the base station or the UE, and obtained without a need to notify the UE by the base station. For example, the first mapping relationship is updated as follows: 0 is mapped to 4, and 5 is mapped to 9, and then a table for a subframe that is corresponding to the second PO and determined according to the foregoing first mapping relationship is as follows:

TABLE 3

Table for a subframe corresponding to the second PO

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 4 | 4 | 9 | 9 |

It can be learned by comparing Table 3 with Table 1 that, by using this mapping relationship, the special UE may affect the conventional UE only in subframe 4 and subframe 9, thereby reducing impact on the conventional UE to some extent. By updating the first mapping relationship, continuous impact on the conventional UE that listens on subframe 0 and subframe 5 is avoided.

A mapping manner with a better effect is that the subframe corresponding to the first PO is mapped to a different subframe. For example, the first mapping relationship is as follows: 0 is mapped to 1, 4 is mapped to 6, 5 is mapped to 7, and 9 is mapped to 8, and then a table for a subframe that is corresponding to the second PO and determined according to the foregoing first mapping relationship is as follows:

TABLE 4

Table for a subframe corresponding to the second PO

| Ns | PO when i_s = 0 | PO when i_s = 1 | PO when i_s = 2 | PO when i_s = 3 |
|---|---|---|---|---|
| 1 | 8 | N/A | N/A | N/A |
| 2 | 3 | 8 | N/A | N/A |
| 4 | 1 | 6 | 7 | 8 |

It may be seen by comparing Table 1 with Table 4 that, a scheduling resource of the special type of UE and that of the conventional UE are located in completely different subframes, thereby avoiding impact caused by the special type of UE on the conventional UE.

In the first implementation manner, by determining that the scheduling resource of the special type of UE and that of the conventional type of UE are in completely different subframes or in partially different subframes, impact caused by the special type of UE on the conventional UE is avoided or reduced.

In a second implementation manner, a first PF and a first PO of a paging message of the first type of UE are determined by using a DRX period of the first type of UE, where the DRX period of the first type of UE is N times as long as a DRX period of the second type of UE, and N is an integer greater than 1. The base station may be used to notify the UE of the DRX period of the first type of UE, so that the UE and the base station use a same DRX period of the first type of UE; or the DRX period of the first type of UE may be pre-configured in the base station or the UE, and obtained without a need to notify the UE by the base station. It may be understood that effects brought by using this manner are as follows: the special type of UE may affect the conventional UE once only at an interval of N times the length of the DRX period. For example, it is assumed that the first PF obtained by means of calculation by using the DRX period of the second type of UE is frame 1, frame 2, frame 3, frame 4, frame 5, frame 6, frame 7, frame 8, frame 9, and frame 10, and then the first PF obtained by means of calculation by using a DRX period five times the length of the DRX period is frame 5 and frame 10. That is, the special type of UE affects the conventional type of UE only by transmitting the paging message of the first type of UE in frame 5 and frame 10, that is, in subframes corresponding to first POs of frame 5 and frame 10. Therefore, impact caused by the special type of UE on the conventional UE is reduced to some extent by using the second implementation manner.

In a third implementation manner, in the conventional art, when a paging message is sent, scheduling resource information is carried in a PDCCH, and the paging message is carried in a PDSCH. The scheduling resource information is used to indicate information about a location and a size of a scheduling resource. The UE determines, by listening in a subframe corresponding to a first PO, whether there is a PDCCH that is scrambled by using a paging radio network temporary identifier (Paging Radio Network Temporary Identifier, hereinafter referred to as P-RNTI). If it is determined that there is a PDCCH that is scrambled by using the paging radio network temporary identifier, the UE acquires the scheduling resource information from the PDCCH, receives the PDSCH on a scheduling resource corresponding to the scheduling resource information, and acquires the paging message. In this implementation manner, by using different scrambling manners, it is implemented that paging messages of the special type of UE and the conventional type of UE are sent on different scheduling resources in a same subframe. That is, a PDCCH that carries scheduling resource information of the first type of UE is scrambled in a non-P-RNTI scrambling manner, and a PDCCH that carries scheduling resource information of the second type of UE is scrambled in a P-RNTI scrambling manner. A paging message of the first type of UE is sent on a scheduling resource corresponding to the scheduling resource information carried in the foregoing PDCCH that is scrambled in the non-P-RNTI scrambling manner, and a paging message of the second type of UE is sent on a scheduling resource corresponding to the scheduling resource information carried in the foregoing PDCCH that is scrambled in the P-RNTI scrambling manner. As long as the non-P-RNTI scrambling manner is an RNTI scrambling manner different from the P-RNTI scrambling manner, the present disclosure sets no limitation to a specific form. The first type of UE may be notified, by using a broadcast message, of the non-P-RNTI scrambling manner used by the base station, or the non-P-RNTI scrambling manner may be pre-configured in the base station or the UE. The present disclosure is not limited thereto. Essence of this embodiment is that different scrambling manners are used, so that it is implemented that the special type of UE and the conventional type of UE may use different scheduling resource information to indicate different scheduling resources, and send the paging message of the special UE and the paging message of the conventional UE on different scheduling resources, to avoid impact caused by the special type of UE on the conventional type of UE.

In a fourth implementation manner, which is similar to the third implementation manner, a paging message of the special type of UE is sent in a same subframe by using different scheduling resource information and different scheduling resources. A difference lies in that: in the third implementation manner, different scrambling manners are used; and in the fourth implementation manner, scheduling resource information of the first type of UE is carried by using a PDCCH of a first downlink control information (Downlink Control Information, hereinafter referred to as DCI) format, and a paging message of the first type of UE is sent on a scheduling resource corresponding to the scheduling resource information of the foregoing first type of UE; and scheduling resource information of the second type of UE is carried by using a PDCCH of a second DCI format, and a paging message of the second type of UE is sent on a scheduling resource corresponding to the scheduling resource information of the second type of UE. In this implementation manner, it is implemented that the special type of UE and the conventional type of UE may use different scheduling resource information to indicate different scheduling resources, and send the paging message of the special UE and the paging message of the conventional UE on different scheduling resources, to avoid impact caused by the special type of UE on the conventional type of UE.

Figure 2:
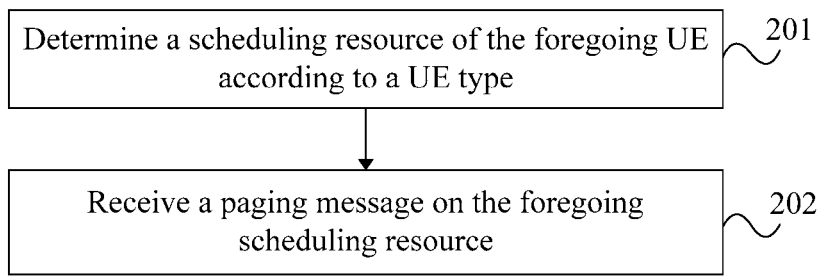
FIG. 2 is a schematic flowchart of Embodiment 2 of a method for paging a user equipment according to the present disclosure.

FIG. 2 is a schematic flowchart of Embodiment 2 of a method for paging a user equipment according to the present disclosure. As shown in FIG. 2, this embodiment is executed by a first type of UE (a special type of UE). The first type of UE in this embodiment acquires a paging message by using a method corresponding to the method on a base station side shown in FIG. 1, and the method in this embodiment is as follows:

201. Determine a scheduling resource of the foregoing UE according to a UE type.

202. Receive a paging message on the foregoing scheduling resource.

When a base station side uses the first implementation manner in the embodiment shown in FIG. 1, correspondingly, the UE determines, by using a DRX period, a first PF and a first PO for sending the paging message of the UE; and then maps, according to a first mapping relationship, a subframe corresponding to the foregoing first PO to a subframe corresponding to a second PO, where at least one subframe of the subframe corresponding to the foregoing first PO is different from a subframe of the subframe corresponding to the second PO in the first mapping relationship. Specifically, for how to map, by using the first mapping relationship, the subframe corresponding to the foregoing first PO to the subframe corresponding to the second PO, refer to the first implementation manner in the embodiment shown in FIG. 1, and details are not described herein again. The paging message of the foregoing UE is received in the subframe corresponding to the second PO of the foregoing first PF. Implementation principles and technical effects of this implementation manner are similar to those of the first implementation manner in the embodiment shown in FIG. 1, and details are not described herein again.

Optionally, the foregoing first mapping relationship is updated at an interval of a preset time period.

When the base station side uses the second implementation manner in the embodiment shown in FIG. 1, correspondingly, the UE determines, by using a DRX period of a first type of UE, a first PF and a first PO for sending the paging message, where the DRX period of the first type of UE is N times as long as a DRX period of a second type of UE, and N is an integer greater than 1. The first type of UE is the special type of UE, the second type of UE is a conventional type of UE, and a maximum bandwidth of a received signal of the second type of UE is greater than a maximum bandwidth of a received signal of the first type of UE. The paging message is received in a subframe corresponding to the first PO of the first PF. In this implementation manner, impact caused by the special type of UE on the conventional type of UE is reduced. Implementation principles of this implementation manner are similar to those of the second implementation manner in the embodiment shown in FIG. 1, and details are not described herein again.

When the base station side uses the third implementation manner in the embodiment shown in FIG. 1, correspondingly, in terms of a manner in which a UE side calculates a first PF and a first PO, the special type of UE is the same as a conventional type of UE. A first PF and a first PO for sending the paging message of the UE are determined by using a DRX period. A difference lies in that: the special type of UE determines, by listening in a subframe corresponding to the first PO, whether there is a PDCCH that uses a non-P-RNTI scrambling manner. If there is a PDCCH that uses the non-P-RNTI scrambling manner, the UE acquires scheduling resource information from the PDCCH; and receives the paging message on a scheduling resource corresponding to the foregoing scheduling resource information. Implementation principles and technical effects of this implementation manner are similar to those of the third implementation manner in the embodiment shown in FIG. 1, and details are not described herein again.

When the base station side uses the fourth implementation manner in the embodiment shown in FIG. 1, correspondingly, a UE side determines, by using a DRX period, a first PF and a first PO for sending the paging message of the UE, and determines, by listening in a subframe corresponding to the first PO, whether there is a PDCCH that is scrambled by using a P-RNTI. If there is a PDCCH that is scrambled by using the P-RNTI, the UE acquires, in the subframe corresponding to the first PO, scheduling resource information carried by using a PDCCH of a first downlink control information format; and receives the paging message on a scheduling resource corresponding to the scheduling resource information. That is, a PDCCH that carries scheduling resource information of the special type of UE and a PDCCH that carries scheduling resource information of a conventional type of UE use different DCI formats. Implementation principles and technical effects of this implementation manner are similar to those of the fourth implementation manner in the embodiment shown in FIG. 1, and details are not described herein again.

Because a signal receiving capability of a UE is poor, quality of a channel of an environment in which the UE is located is poor, or the like, the UE always fails to successively receive paging signaling, and the paging signaling usually needs to be repeatedly sent for multiple times, to ensure that the UE can successfully receive the paging signaling. However, if a quantity of repeated sending times is extremely large, it may cause extremely high signaling overheads, which affects network system performance. If a quantity of repeated sending times is extremely small, it may cause that the UE cannot successfully receive the paging signaling. Therefore, for how to determine a quantity of times for repeatedly sending a paging message, the present disclosure further provides an embodiment. A main idea is that the quantity of repeated sending times is properly determined according to coverage enhancement requirement information of the UE, to improve a success rate of receiving the paging message by the UE, and avoid extremely high signaling overheads.

Figure 3:
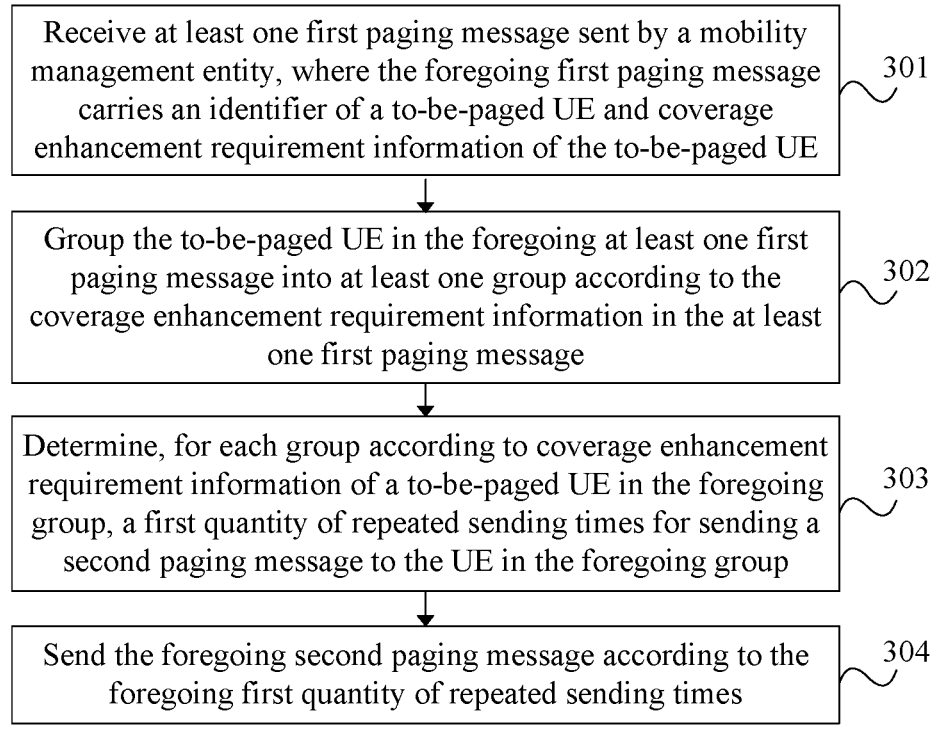
FIG. 3 is a schematic flowchart of Embodiment 3 of a method for paging a user equipment according to the present disclosure.

FIG. 3 is a schematic flowchart of Embodiment 3 of a method for paging a user equipment according to the present disclosure. As shown in FIG. 3, this embodiment is executed by a base station, and the method in this embodiment includes:

301. Receive at least one first paging message sent by a mobility management entity, where the foregoing first paging message carries an identifier of a to-be-paged UE and coverage enhancement requirement information of the to-be-paged UE.

The coverage enhancement requirement information is a coverage enhancement level, a coverage enhancement value, or a second quantity of repeated sending times that is of the foregoing to-be-paged UE. Generally, a quantity of repeated sending times may be determined according to the coverage enhancement level or the coverage enhancement value. Usually, a higher coverage enhancement level or a larger coverage enhancement value indicates a larger quantity of repeated sending times.

302. Group the to-be-paged UE in the foregoing at least one first paging message into at least one group according to the coverage enhancement requirement information in the at least one first paging message.

The at least one group may be one group, or may be multiple groups. When the at least one group is one group, grouping is not required.

When the coverage enhancement requirement information is the second quantity of repeated sending times, the to-be-paged UE is grouped according to the quantity of repeated sending times. For example, a to-be-paged UE whose second quantity of repeated sending times is less than or equal to a first preset value belongs to a first group, a to-be-paged UE whose second quantity of repeated sending times is greater than the first preset value and less than or equal to a second preset value belongs to a second group, and a to-be-paged UE whose second quantity of repeated sending times is greater than the second preset value and is less than a third preset value belongs to a third group. The present disclosure sets no limitation to a specific grouping manner.

When the coverage enhancement requirement information is the coverage enhancement level, the to-be-paged UE is grouped according to the coverage enhancement level.

When the coverage enhancement requirement information is the coverage enhancement value, the to-be-paged UE is grouped according to the coverage enhancement value.

303. Determine, for each group according to coverage enhancement requirement information of a to-be-paged UE in the foregoing group, a first quantity of repeated sending times for sending a second paging message to the UE in the foregoing group.

The second paging message carries an identifier of the to-be-paged UE in the foregoing group.

Specifically, for each group, the first quantity of repeated sending times for sending the second paging message to the to-be-paged UE in the foregoing group is determined according to a maximum coverage enhancement level, a maximum coverage enhancement value, or a maximum second quantity of repeated sending times that is of the to-be-paged UE in the foregoing group. That is, it is equivalent to that the to-be-paged UE in the at least one first paging message is first grouped according to a success rate of receiving a paging message; and the first quantity of repeated sending times for sending the second paging message to to-be-paged UE in each group is determined according to a coverage enhancement level, a coverage enhancement value, or a second quantity of repeated sending times that is of a to-be-paged UE whose success rate of receiving a signal is the lowest in each group.

304. Send the foregoing second paging message according to the foregoing first quantity of repeated sending times.

That is, the second paging message is sent to a corresponding group according to the first quantity of repeated sending times of each group.

By using the technical solution in the foregoing embodiment, a success rate of receiving a paging message by a UE may be improved, and extremely high signaling overheads are avoided.

Figure 4:
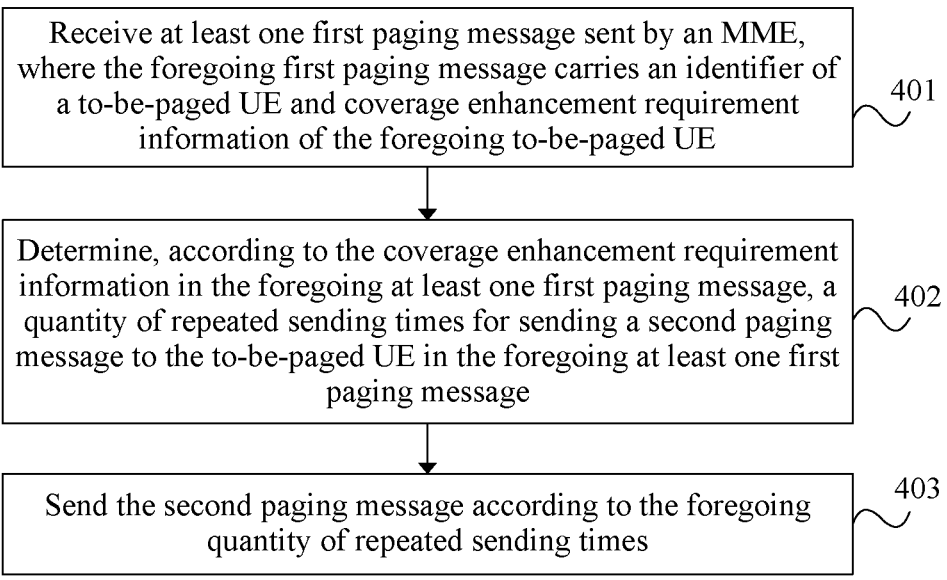
FIG. 4 is a schematic flowchart of Embodiment 4 of a method for paging a user equipment according to the present disclosure.

FIG. 4 is a schematic flowchart of Embodiment 4 of a method for paging a user equipment according to the present disclosure. As shown in FIG. 4, this embodiment is executed by a base station. A difference between the embodiment shown in FIG. 4 and the embodiment shown in FIG. 3 lies in that: in the embodiment shown in FIG. 3, a to-be-paged UE is grouped according to coverage enhancement requirement information of the to-be-paged UE in at least one first paging message; and in the embodiment in FIG. 4, a to-be-paged UE is not grouped, and the method in this embodiment includes:

401. Receive at least one first paging message sent by an MME, where the foregoing first paging message carries an identifier of a to-be-paged UE and coverage enhancement requirement information of the foregoing to-be-paged UE.

402. Determine, according to the coverage enhancement requirement information in the foregoing at least one first paging message, a quantity of repeated sending times for sending a second paging message to the to-be-paged UE in the foregoing at least one first paging message.

The foregoing second paging message carries the identifier of the to-be-paged UE in the foregoing at least one first paging message.

403. Send the second paging message according to the foregoing quantity of repeated sending times.

In the technical solution of this embodiment, it is equivalent to that the quantity of repeated sending times for sending the second paging message to the to-be-paged UE in the foregoing at least one first paging message is determined according to coverage enhancement requirement information of a to-be-paged UE whose success rate of receiving a signal is the lowest in the at least one first paging message.

In this embodiment, a base station determines, according to enhancement requirement information, a proper quantity of repeated sending times for sending a paging message, so that a success rate of receiving the paging message by a UE may be improved, and extremely high signaling overheads are avoided. In the foregoing embodiment, to improve an access success rate of the UE, a dedicated access resource, such as a physical random access channel (Physical Random Access Channel, PRACH) PRACH resource and/or preamble code, may be carried in the paging message, so that the UE initiates access according to the foregoing dedicated access resource, thereby improving the access success rate and access efficiency of the foregoing type of UE.

Figure 5:
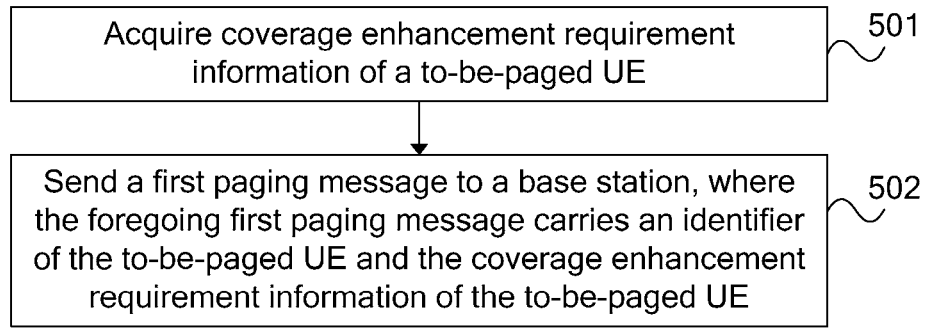
FIG. 5 is a schematic flowchart of Embodiment 5 of a method for paging a user equipment according to the present disclosure.

FIG. 5 is a schematic flowchart of Embodiment 5 of a method for paging a user equipment according to the present disclosure. As shown in FIG. 5, FIG. 5 is executed by a mobility management entity (Mobility Management Entity, MME), and the method in this embodiment is as follows:

501. Acquire coverage enhancement requirement information of a to-be-paged UE.

Specifically, the coverage enhancement requirement information reported by the to-be-paged UE by using non-access stratum (Non-Access Stratum, NAS) signaling may be received, and stored in a context of the UE.

Alternatively, the coverage enhancement requirement information of the to-be-paged UE that is reported by the base station is received, and is stored in a context of the UE.

The coverage enhancement requirement information is a coverage enhancement level, a coverage enhancement value, or a second quantity of repeated sending times.

502. Send a first paging message to a base station, where the foregoing first paging message carries an identifier of the to-be-paged UE and the coverage enhancement requirement information of the to-be-paged UE.

The base station may determine, according to corresponding coverage enhancement requirement information in the first paging message, a quantity of repeated sending times for sending a second paging message to the to-be-paged UE.

In this embodiment, an MME acquires coverage enhancement requirement information of a to-be-paged UE, and sends a first paging message to a base station, where the first paging message carries an identifier of the to-be-paged UE and the coverage enhancement requirement information of the to-be-paged UE, so that the base station determines, according to the foregoing coverage enhancement requirement information, a proper quantity of repeated sending times for sending a second paging message, so that a success rate of receiving a paging message by the UE may be improved, and extremely high signaling overheads are avoided.

Figure 6:
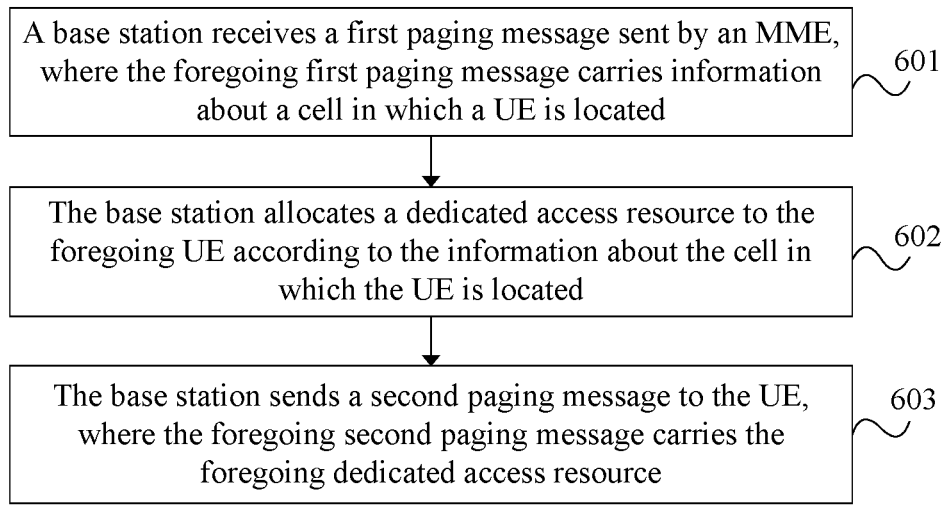
FIG. 6 is a schematic flowchart of Embodiment 6 of a method for paging a user equipment according to the present disclosure.

When a signal receiving capability of a UE itself is poor or quality of a channel of an environment in which the UE is located is poor, during network access, a resource competition capability is poor and the access usually fails. To improve an access success rate of the foregoing UE, however, the UE having this feature is generally located in a fixed cell, the present disclosure further provides an embodiment. FIG. 6 is a schematic flowchart of Embodiment 6 of a method for paging a user equipment according to an embodiment of the present disclosure. As shown in FIG. 6, the method includes:

601. A base station receives a first paging message sent by an MME, where the foregoing first paging message carries information about a cell in which a UE is located.

602. The base station allocates a dedicated access resource to the foregoing UE according to the information about the cell in which the UE is located.

The dedicated access resource may be a PRACH resource and/or preamble code.

603. The base station sends a second paging message to the UE, where the foregoing second paging message carries the foregoing dedicated access resource.

The UE initiates access according to the foregoing dedicated access resource, thereby improving an access success rate and access efficiency of the UE.

In this embodiment, a paging message sent to a UE by a base station indicates a dedicated access resource of the UE, so that the UE initiates access by using the dedicated access resource, thereby improving an access success rate and access efficiency of the UE.

Figure 7:
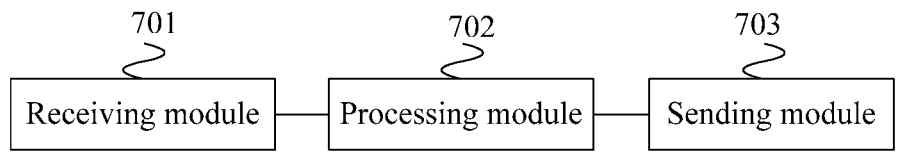
FIG. 7 is a schematic structural diagram of Embodiment 1 of an apparatus for paging a user equipment according to the present disclosure.

FIG. 7 is a schematic structural diagram of Embodiment 1 of an apparatus for paging a user equipment according to the present disclosure. As shown in FIG. 7, the apparatus in this embodiment includes a receiving module 701, a processing module 702, and a sending module 703. The receiving module 701 is configured to receive a paging message sent by a mobility management entity (MME), where the foregoing paging message includes indication information of a user equipment (UE) type; the processing module 702 is configured to determine, according to the foregoing indication information of the UE type, a scheduling resource for sending a paging message of the foregoing UE type; and the sending module 703 is configured to send the paging message of the foregoing UE type on the foregoing scheduling resource.

In the foregoing embodiment, if the foregoing indication information of the UE type indicates a first type of UE, and a maximum bandwidth of a received signal of the foregoing first type of UE is a preset value, the foregoing processing module 702 is configured to determine, by using a discontinuous reception (DRX) period of the foregoing first type of UE, a first paging frame (PF) and a first paging opportunity (PO) for sending a paging message of the foregoing first type of UE; and map, according to a first mapping relationship, a subframe corresponding to the foregoing first PO to a subframe corresponding to a second PO, where at least one subframe of the subframe corresponding to the foregoing first PO is different from a subframe of the subframe corresponding to the foregoing second PO in the foregoing first mapping relationship; and the foregoing sending module 703 is configured to send the paging message of the foregoing first type of UE in the subframe corresponding to the second PO of the foregoing first PF.

In the foregoing embodiment, the foregoing first mapping relationship is updated at an interval of a preset time period.

In the foregoing embodiment, if the foregoing indication information of the UE type indicates that the foregoing UE is a first type of UE, and a maximum bandwidth of a received signal of the foregoing first type of UE is a preset value, the foregoing processing module 702 is configured to determine, by using a discontinuous reception (DRX) period of the foregoing first type of UE, a first PF and a first PO of a paging message of the foregoing first type of UE, where the DRX period of the foregoing first type of UE is N times as long as a DRX period of a second type of UE, N is an integer greater than 1, and a maximum bandwidth of a received signal of the foregoing second type of UE is greater than the maximum bandwidth of a received signal of the foregoing first type of UE; and the foregoing sending module 703 is configured to transmit the paging message of the foregoing first type of UE in a subframe corresponding to the first PO of the foregoing first PF.

In the foregoing embodiment, the foregoing sending module 703 is configured to: scramble, in a non-paging radio network temporary identifier (non-P-RNTI) scrambling manner, a physical downlink control channel (PDCCH) that carries scheduling resource information of a first type of UE, where a P-RNTI scrambling manner is a scrambling manner used by a PDCCH that carries scheduling resource information of a second type of UE, and a maximum bandwidth of a received signal of the foregoing second type of UE is greater than a maximum bandwidth of a received signal of the foregoing first type of UE; and send a paging message of the foregoing first type of UE on a scheduling resource corresponding to the scheduling resource information carried in the foregoing PDCCH that is scrambled in the non-P-RNTI scrambling manner.

In the foregoing embodiment, the foregoing sending module 703 is configured to: carry scheduling resource information of a first type of UE by using a PDCCH of a first downlink control information format, and send a paging message of the foregoing first type of UE on a scheduling resource corresponding to the scheduling resource information of the foregoing first type of UE; and carry scheduling resource information of a second type of UE by using a PDCCH of a second downlink control information format, and send a paging message of the foregoing second type of UE on a scheduling resource corresponding to the scheduling resource information of the foregoing second type of UE, where a maximum bandwidth of a received signal of the foregoing second type of UE is greater than a maximum bandwidth of a received signal of the foregoing first type of UE.

The apparatus in this embodiment may be used to implement the technical solution in the method embodiment shown in FIG. 1. Implementation principles and technical effects thereof are similar, and details are not described herein again.

Figure 8:
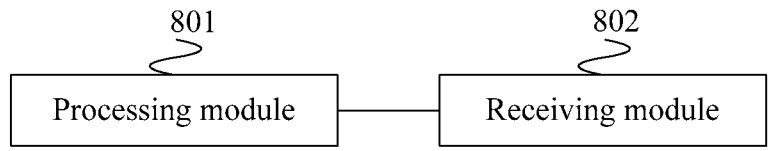
FIG. 8 is a schematic structural diagram of Embodiment 2 of an apparatus for paging a user equipment according to the present disclosure.

FIG. 8 is a schematic structural diagram of Embodiment 2 of an apparatus for paging a user equipment according to the present disclosure. As shown in FIG. 8, the apparatus in this embodiment includes a processing module 801 and a receiving module 802. The processing module 801 is configured to determine a scheduling resource of the user equipment (UE); and the receiving module 802 is configured to receive a paging message on the foregoing scheduling resource.

In the foregoing embodiment, the foregoing processing module 801 is configured to determine, by using a discontinuous reception (DRX) period, a first paging frame (PF) and a first paging opportunity (PO) for sending the paging message of the UE; and map, according to a first mapping relationship, a subframe corresponding to the foregoing first PO to a subframe corresponding to a second PO, where at least one subframe of the subframe corresponding to the foregoing first PO is different from a subframe of the subframe corresponding to the foregoing second PO in the foregoing first mapping relationship; and the foregoing receiving module 802 is configured to receive the paging message in the subframe corresponding to the second PO of the foregoing first PF.

In the foregoing embodiment, the foregoing first mapping relationship is updated at an interval of a preset time period.

In the foregoing embodiment, the foregoing processing module 801 is configured to: determine, by using a discontinuous reception (DRX) period of a first type of UE, a first PF and a first PO for sending the paging message, where the DRX period of the foregoing first type of UE is N times as long as a DRX period of a second type of UE, N is an integer greater than 1, and a maximum bandwidth of a received signal of the foregoing second type of UE is greater than a maximum bandwidth of a received signal of the foregoing first type of UE; and the foregoing receiving module 802 is configured to receive the paging message in a subframe corresponding to the first PO of the foregoing first PF.

In the foregoing embodiment, the foregoing receiving module 802 is configured to determine, by using a DRX period, a first PF and a first PO for sending the paging message of the UE; listen on, in a subframe corresponding to the foregoing first PO, a physical downlink control channel (PDCCH) that uses a non-paging radio network temporary identifier (non-P-RNTI) scrambling manner; acquire scheduling resource information from the foregoing PDCCH; and receive the paging message on a scheduling resource corresponding to the foregoing scheduling resource information.

In the foregoing embodiment, the foregoing receiving module 802 is configured to determine, by using a DRX period, a first PF and a first PO for sending the paging message of the UE; acquire, in a subframe corresponding to the foregoing first PO, scheduling resource information carried by using a PDCCH of a first downlink control information format; and receive the paging message on a scheduling resource corresponding to the foregoing scheduling resource information.

The apparatus in this embodiment may be used to implement the technical solution in the method embodiment shown in FIG. 2. Implementation principles and technical effects thereof are similar, and details are not described herein again.

Figure 9:
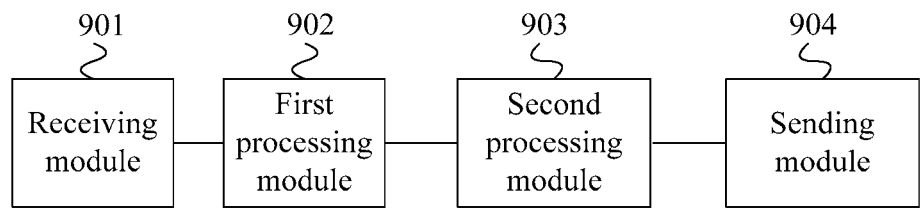
FIG. 9 is a schematic structural diagram of Embodiment 3 of an apparatus for paging a user equipment according to the present disclosure.

FIG. 9 is a schematic structural diagram of Embodiment 3 of an apparatus for paging a user equipment according to the present disclosure. As shown in FIG. 9, the apparatus in this embodiment includes a receiving module 901, a first processing module 902, a second processing module 903, and a sending module 904. The receiving module 901 is configured to receive at least one first paging message sent by a mobility management entity (MME), where the foregoing first paging message carries an identifier of a to-be-paged user equipment (UE) and coverage enhancement requirement information of the foregoing to-be-paged UE; the first processing module 902 is configured to group the to-be-paged UE in the foregoing at least one first paging message into at least one group according to the coverage enhancement requirement information in the foregoing at least one first paging message; the second processing module 903 is configured to determine, for each of the foregoing group according to coverage enhancement requirement information of a to-be-paged UE in the foregoing group, a first quantity of repeated sending times for sending a second paging message to the UE in the foregoing group, where the foregoing second paging message carries an identifier of the to-be-paged UE in the group; and the sending module 904 is configured to send the foregoing second paging message according to the foregoing first quantity of repeated sending times.

In the foregoing embodiment, the coverage enhancement requirement information of the foregoing to-be-paged UE is a coverage enhancement level, a coverage enhancement value, or a second quantity of repeated sending times that is of the foregoing to-be-paged UE; and the foregoing second processing module 903 is configured to determine, according to a maximum coverage enhancement level, a maximum coverage enhancement value, or a maximum second quantity of repeated sending times that is of the to-be-paged UE in the foregoing group, the first quantity of repeated sending times for sending the second paging message to the to-be-paged UE in the foregoing group.

In the foregoing embodiment, the foregoing second paging message further includes dedicated access resource information, so that the to-be-paged UE in the foregoing second paging message accesses a network according to the foregoing dedicated access resource information.

The apparatus in this embodiment may be used to implement the technical solution in the method embodiment shown in FIG. 3. Implementation principles and technical effects thereof are similar, and details are not described herein again.

Figure 10:
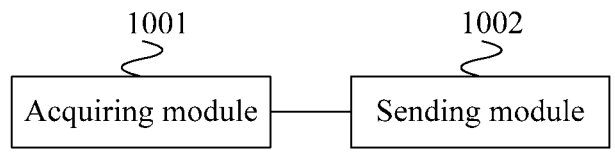
FIG. 10 is a schematic structural diagram of Embodiment 4 of an apparatus for paging a user equipment according to the present disclosure.

FIG. 10 is a schematic structural diagram of Embodiment 4 of an apparatus for paging a user equipment according to the present disclosure. As shown in FIG. 10, the apparatus in this embodiment includes an acquiring module 1001 and a sending module 1002. The acquiring module 1001 is configured to acquire coverage enhancement requirement information of a to-be-paged user equipment (UE); and the sending module 1002 is configured to send a first paging message to a base station, where the foregoing first paging message carries an identifier of the foregoing to-be-paged UE and the coverage enhancement requirement information of the foregoing to-be-paged UE.

In the foregoing embodiment, the forgoing acquiring module 1001 is configured to receive the coverage enhancement requirement information reported by the to-be-paged UE by using non-access stratum (NAS) signaling, where the foregoing coverage enhancement requirement information is a coverage enhancement level, a coverage enhancement value, or a second quantity of repeated sending times.

In the foregoing embodiment, the forgoing acquiring module 1001 is configured to receive the coverage enhancement requirement information of the to-be-paged UE that is reported by the base station, where the coverage enhancement requirement information is a coverage enhancement level, a coverage enhancement value, or a second quantity of repeated sending times.

The apparatus in this embodiment may be used to implement the technical solution in the method embodiment shown in FIG. 5. Implementation principles and technical effects thereof are similar, and details are not described herein again.

Figure 11:
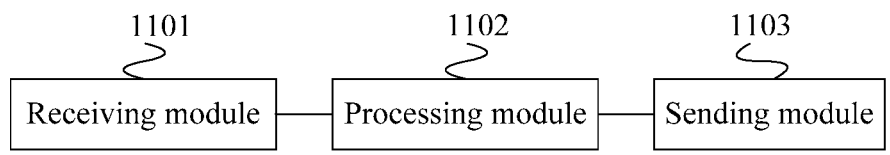
FIG. 11 is a schematic structural diagram of Embodiment 5 of an apparatus for paging a user equipment according to the present disclosure.

FIG. 11 is a schematic structural diagram of Embodiment 5 of an apparatus for paging a user equipment according to the present disclosure. As shown in FIG. 11, the apparatus in this embodiment includes a receiving module 1101, a processing module 1102, and a sending module 1103. The receiving module 1101 is configured to receive at least one first paging message sent by a mobility management entity (MME), where the foregoing first paging message carries an identifier of a to-be-paged user equipment (UE) and coverage enhancement requirement information of the foregoing to-be-paged UE; the processing module 1102 is configured to determine, according to the coverage enhancement requirement information in the foregoing at least one first paging message, a quantity of repeated sending times for sending a second paging message to the to-be-paged UE in the foregoing at least one first paging message, where the foregoing second paging message carries the identifier of the to-be-paged UE in the foregoing at least one first paging message; and the sending module 1103 is configured to send the foregoing second paging message according to the foregoing quantity of repeated sending times.

The apparatus in this embodiment may be used to implement the technical solution in the method embodiment shown in FIG. 4. Implementation principles and technical effects thereof are similar, and details are not described herein again.

Figure 12:
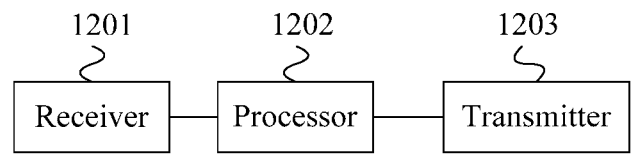
FIG. 12 is a schematic structural diagram of Embodiment 6 of an apparatus for paging a user equipment according to the present disclosure.

FIG. 12 is a schematic structural diagram of Embodiment 6 of an apparatus for paging a user equipment according to the present disclosure. As shown in FIG. 12, the apparatus in this embodiment includes a receiver 1201, a processor 1202, and a transmitter 1203. The receiver 1201 is configured to receive a paging message sent by a mobility management entity (MME), where the foregoing paging message includes indication information of a user equipment (UE) type; the processor 1202 is configured to determine, according to the foregoing indication information of the UE type, a scheduling resource for sending a paging message of the foregoing UE type; and the transmitter 1203 is configured to send the paging message of the foregoing UE type on the foregoing scheduling resource.

In the foregoing embodiment, if the foregoing indication information of the UE type indicates a first type of UE, and a maximum bandwidth of a received signal of the foregoing first type of UE is a preset value, the foregoing processor 1202 is configured to determine, by using a discontinuous reception (DRX) period of the foregoing first type of UE, a first paging frame (PF) and a first paging opportunity (PO) for sending a paging message of the foregoing first type of UE; and map, according to a first mapping relationship, a subframe corresponding to the foregoing first PO to a subframe corresponding to a second PO, where at least one subframe of the subframe corresponding to the foregoing first PO is different from a subframe of the subframe corresponding to the foregoing second PO in the foregoing first mapping relationship; and the foregoing transmitter 1203 is configured to send the paging message of the foregoing first type of UE in the subframe corresponding to the second PO of the foregoing first PF.

In the foregoing embodiment, the foregoing first mapping relationship is updated at an interval of a preset time period.

In the foregoing embodiment, if the foregoing indication information of the UE type indicates that the foregoing UE is a first type of UE, and a maximum bandwidth of a received signal of the foregoing first type of UE is a preset value, the foregoing processor 1202 is configured to determine, by using a discontinuous reception (DRX) period of the foregoing first type of UE, a first PF and a first PO of a paging message of the foregoing first type of UE, where the DRX period of the foregoing first type of UE is N times as long as a DRX period of a second type of UE, N is an integer greater than 1, and a maximum bandwidth of a received signal of the foregoing second type of UE is greater than the maximum bandwidth of a received signal of the foregoing first type of UE; and the foregoing transmitter 1203 is configured to transmit the paging message of the foregoing first type of UE in a subframe corresponding to the first PO of the foregoing first PF.

In the foregoing embodiment, the foregoing transmitter 1203 is configured to: scramble, in a non-paging radio network temporary identifier (non-P-RNTI) scrambling manner, a physical downlink control channel (PDCCH) that carries scheduling resource information of a first type of UE, where a P-RNTI scrambling manner is a scrambling manner used by a PDCCH that carries scheduling resource information of a second type of UE, and a maximum bandwidth of a received signal of the foregoing second type of UE is greater than a maximum bandwidth of a received signal of the foregoing first type of UE; and send a paging message of the foregoing first type of UE on a scheduling resource corresponding to the scheduling resource information carried in the foregoing PDCCH that is scrambled in the non-P-RNTI scrambling manner.

In the foregoing embodiment, the foregoing transmitter 1203 is configured to: carry scheduling resource information of a first type of UE by using a PDCCH of a first downlink control information format, and send a paging message of the foregoing first type of UE on a scheduling resource corresponding to the scheduling resource information of the foregoing first type of UE; and carry scheduling resource information of a second type of UE by using a PDCCH of a second downlink control information format, and send a paging message of the foregoing second type of UE on a scheduling resource corresponding to the scheduling resource information of the foregoing second type of UE, where a maximum bandwidth of a received signal of the foregoing second type of UE is greater than a maximum bandwidth of a received signal of the foregoing first type of UE.

The apparatus in this embodiment may be used to implement the technical solution in the method embodiment shown in FIG. 1. Implementation principles and technical effects thereof are similar, and details are not described herein again.

Figure 13:
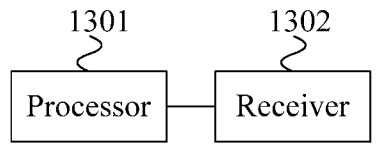
FIG. 13 is a schematic structural diagram of Embodiment 7 of an apparatus for paging a user equipment according to the present disclosure.

FIG. 13 is a schematic structural diagram of Embodiment 7 of an apparatus for paging a user equipment according to the present disclosure. As shown in FIG. 13, the apparatus in this embodiment includes a processor 1301 and a receiver 1302. The processor 1301 is configured to determine a scheduling resource of the user equipment (UE); and the receiver 1302 is configured to receive a paging message on the foregoing scheduling resource.

In the foregoing embodiment, the foregoing processor 1301 is configured to determine, by using a discontinuous reception (DRX) period, a first paging frame (PF) and a first paging opportunity (PO) for sending the paging message of the UE; and map, according to a first mapping relationship, a subframe corresponding to the foregoing first PO to a subframe corresponding to a second PO, where at least one subframe of the subframe corresponding to the foregoing first PO is different from a subframe of the subframe corresponding to the foregoing second PO in the foregoing first mapping relationship; and the foregoing receiver 1302 is configured to receive the paging message in the subframe corresponding to the second PO of the foregoing first PF.

In the foregoing embodiment, the foregoing first mapping relationship is updated at an interval of a preset time period.

In the foregoing embodiment, the foregoing processor 1301 is configured to: determine, by using a discontinuous reception (DRX) period of a first type of UE, a first PF and a first PO for sending the paging message, where the DRX period of the foregoing first type of UE is N times as long as a DRX period of a second type of UE, N is an integer greater than 1, and a maximum bandwidth of a received signal of the foregoing second type of UE is greater than a maximum bandwidth of a received signal of the foregoing first type of UE; and the foregoing receiver 1302 is configured to receive the paging message in a subframe corresponding to the first PO of the foregoing first PF.

In the foregoing embodiment, the foregoing receiver 1302 is configured to determine, by using a DRX period, a first PF and a first PO for sending the paging message of the UE; listen on, in a subframe corresponding to the foregoing first PO, a physical downlink control channel (PDCCH) that uses a non-paging radio network temporary identifier (non-P-RNTI) scrambling manner; acquire scheduling resource information from the foregoing PDCCH; and receive the paging message on a scheduling resource corresponding to the foregoing scheduling resource information.

In the foregoing embodiment, the foregoing receiver 1302 is configured to determine, by using a DRX period, a first PF and a first PO for sending the paging message of the UE; acquire, in a subframe corresponding to the foregoing first PO, scheduling resource information carried by using a PDCCH of a first downlink control information format; and receive the paging message on a scheduling resource corresponding to the foregoing scheduling resource information.

The apparatus in this embodiment may be used to implement the technical solution in the method embodiment shown in FIG. 2. Implementation principles and technical effects thereof are similar, and details are not described herein again.

Figure 14:
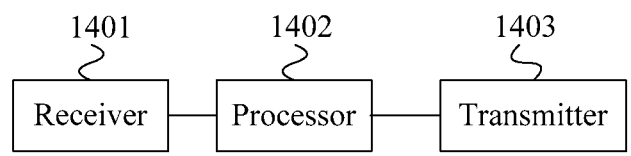
FIG. 14 is a schematic structural diagram of Embodiment 8 of an apparatus for paging a user equipment according to the present disclosure.

FIG. 14 is a schematic structural diagram of Embodiment 8 of an apparatus for paging a user equipment according to the present disclosure. As shown in FIG. 14, the apparatus in this embodiment includes a receiver 1401, a processor 1402, and a transmitter 1403. The receiver 1401 is configured to receive at least one first paging message sent by a mobility management entity (MME), where the foregoing first paging message carries an identifier of a to-be-paged user equipment (UE) and coverage enhancement requirement information of the foregoing to-be-paged UE; the processor 1402 is configured to group the to-be-paged UE in the foregoing at least one first paging message into at least one group according to the coverage enhancement requirement information in the foregoing at least one first paging message; and determine, for each of the foregoing group according to coverage enhancement requirement information of a to-be-paged UE in the foregoing group, a first quantity of repeated sending times for sending a second paging message to the UE in the foregoing group, where the foregoing second paging message carries an identifier of the to-be-paged UE in the group; and the transmitter 1403 is configured to send the foregoing second paging message according to the foregoing first quantity of repeated sending times.

In the foregoing embodiment, the coverage enhancement requirement information of the foregoing to-be-paged UE is a coverage enhancement level, a coverage enhancement value, or a second quantity of repeated sending times that is of the foregoing to-be-paged UE; and the foregoing processor 1402 is configured to determine, according to a maximum coverage enhancement level, a maximum coverage enhancement value, or a maximum second quantity of repeated sending times that is of the to-be-paged UE in the foregoing group, the first quantity of repeated sending times for sending the second paging message to the to-be-paged UE in the foregoing group.

In the foregoing embodiment, the foregoing second paging message further includes dedicated access resource information, so that the to-be-paged UE in the foregoing second paging message accesses a network according to the foregoing dedicated access resource information.

The apparatus in this embodiment may be used to implement the technical solution in the method embodiment shown in FIG. 3. Implementation principles and technical effects thereof are similar, and details are not described herein again.

Figure 15:
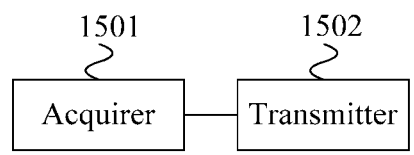
FIG. 15 is a schematic structural diagram of Embodiment 9 of an apparatus for paging a user equipment according to the present disclosure.

FIG. 15 is a schematic structural diagram of Embodiment 9 of an apparatus for paging a user equipment according to the present disclosure. As shown in FIG. 15, the apparatus in this embodiment includes an acquirer 1501 and a transmitter 1502. The acquirer 1501 is configured to acquire coverage enhancement requirement information of a to-be-paged user equipment (UE); and the transmitter 1502 is configured to send a first paging message to a base station, where the foregoing first paging message carries an identifier of the foregoing to-be-paged UE and the coverage enhancement requirement information of the foregoing to-be-paged UE.

In the foregoing embodiment, the forgoing acquirer 1501 is configured to receive the coverage enhancement requirement information reported by the to-be-paged UE by using non-access stratum (NAS) signaling, where the foregoing coverage enhancement requirement information is a coverage enhancement level, a coverage enhancement value, or a second quantity of repeated sending times.

In the foregoing embodiment, the forgoing acquirer 1501 is configured to receive the coverage enhancement requirement information of the to-be-paged UE that is reported by the base station, where the coverage enhancement requirement information is a coverage enhancement level, a coverage enhancement value, or a second quantity of repeated sending times.

The apparatus in this embodiment may be used to implement the technical solution in the method embodiment shown in FIG. 5. Implementation principles and technical effects thereof are similar, and details are not described herein again.

Figure 16:
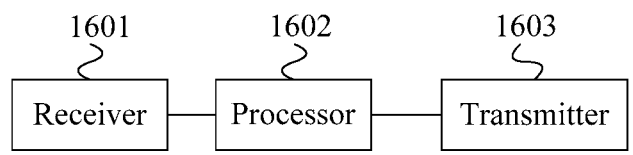
FIG. 16 is a schematic structural diagram of Embodiment 10 of an apparatus for paging a user equipment according to the present disclosure.

FIG. 16 is a schematic structural diagram of Embodiment 10 of an apparatus for paging a user equipment according to the present disclosure. The apparatus in this embodiment includes a receiver 1601, a processor 1602, and a transmitter 1603. The receiver 1601 is configured to receive at least one first paging message sent by a mobility management entity (MME), where the foregoing first paging message carries an identifier of a to-be-paged user equipment (UE) and coverage enhancement requirement information of the foregoing to-be-paged UE; the processor 1602 is configured to determine, according to the coverage enhancement requirement information in the foregoing at least one first paging message, a quantity of repeated sending times for sending a second paging message to the to-be-paged UE in the foregoing at least one first paging message, where the foregoing second paging message carries the identifier of the to-be-paged UE in the foregoing at least one first paging message; and the transmitter 1603 is configured to send the foregoing second paging message according to the foregoing quantity of repeated sending times.

The apparatus in this embodiment may be used to implement the technical solution in the method embodiment shown in FIG. 4. Implementation principles and technical effects thereof are similar, and details are not described herein again.

Persons of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a read-only memory (ROM), a random-access memory (RAM), a magnetic disc, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for paging a user equipment, the method comprising:
   receiving, by a base station, at least one first paging message sent by a mobility management entity (MME), wherein the first paging message carries an identifier of a to-be-paged user equipment (UE) and coverage enhancement requirement information of the to-be-paged UE that includes a coverage enhancement level, a coverage enhancement value or a second quantity of repeated sending times;
   grouping, by the base station, the to-be-paged UE in the at least one first paging message into at least two groups of to-be-paged UEs according to the coverage enhancement requirement information in the at least one first paging message;
   after receiving the coverage enhancement requirement information from the MME, determining, by the base station, a first quantity of repeated sending times for sending a second paging message to the to-be-paged UE according to a maximum of the coverage enhancement requirement information in the group to which the to-be-paged UE belongs; and
   sending, by the base station, the second paging message according to the first quantity of repeated sending times, wherein the second paging message carries the identifier of the to-be-paged UE.

2. The method according to claim 1, wherein the second paging message further comprises dedicated access resource information, so that the to-be-paged UE accesses a network according to the dedicated access resource information.

3. An apparatus for paging a user equipment comprising:
   a processor;
   a receiver configured to cooperate with the processor to receive at least one first paging message sent by a mobility management entity (MME), wherein the first paging message carries an identifier of a to-be-paged user equipment (UE) and coverage enhancement requirement information of the to-be-paged UE that includes a coverage enhancement level, a coverage enhancement value or a second quantity of repeated sending times;
   the processor configured to
      (a) group the to-be-paged UE in the at least one first paging message into at least two groups of to-be-paged UEs according to the coverage enhancement requirement information in the at least one first paging message, and
      (b) after receiving the coverage enhancement requirement information from the MME, determine a first quantity of repeated sending times for sending a second paging message to the to-be-paged UE according to a maximum of the coverage enhancement requirement information in the group to which the to-be-paged UE belongs; and
   a transmitter configured to cooperate with the processor to send the second paging message according to the first quantity of repeated sending times, wherein the second paging message carries the identifier of the to-be-paged UE.

4. The apparatus according to claim 3, wherein the second paging message further comprises dedicated access resource information, so that the to-be-paged UE in the second paging message accesses a network according to the dedicated access resource information.

5. The method according to claim 1, wherein a maximum bandwidth of a received signal of a first type of UE is a preset value and the base station sends a paging message of a second type of UE on a scheduling resource within a bandwidth of the preset value to reduce or avoid impact caused by the first type of UE on the second type of UE.

6. The method according to claim 5, including
   carrying scheduling resource information of the first type of UE by using a physical downlink control channel (PDCCH) of a first downlink control information format, and sending a paging message of the first type of UE on a scheduling resource corresponding to the scheduling resource information of the first type of UE; and
   carrying scheduling resource information of a second type of UE by using a PDCCH of a second downlink control information format, and sending a paging message of the second type of UE on a scheduling resource corresponding to the scheduling resource information of the second type of UE, wherein a maximum bandwidth of a received signal of the second type of UE is greater than a maximum bandwidth of a received signal of the first type of UE.

7. The apparatus according to claim 3, wherein a maximum bandwidth of a received signal of a first type of UE is a preset value and the processor is further configured to send a paging message of a second type of UE on a scheduling resource within a bandwidth of the preset value to reduce or avoid impact caused by the first type of UE on the second type of UE.

8. The apparatus according to claim 7, wherein the processor is further configured to:

carry scheduling resource information of the first type of UE by using a physical downlink control channel (PDCCH) of a first downlink control information format, and sending a paging message of the first type of UE on a scheduling resource corresponding to the scheduling resource information of the first type of UE; and carry scheduling resource information of a second type of UE by using a PDCCH of a second downlink control information format, and sending a paging message of the second type of UE on a scheduling resource corresponding to the scheduling resource information of the second type of UE, wherein a maximum bandwidth of a received signal of the second type of UE is greater than a maximum bandwidth of a received signal of the first type of UE.

9. A non-transitory computer readable medium storing instructions executable by a processor such that, when executed by the processor, the processor is configured to provide at least the following operations:

receiving at least one first paging message that includes an identifier of a to-be-paged user equipment (UE) and coverage enhancement requirement information of the to-be-paged UE that includes a coverage enhancement level, a coverage enhancement value or a second quantity of repeated sending times;

grouping the to-be-paged UE in the at least one first paging message into at least two groups of to-be-paged UEs according to the coverage enhancement requirement information in the at least one first paging message;

after receiving the coverage enhancement requirement information from the MME, determining a first quantity of repeated sending times for sending a second paging message to the to-be-paged UE according to a maximum of the coverage enhancement requirement information in the group to which the to-be-paged UE belongs; and sending the second paging message according to the first quantity of repeated sending times, wherein the second paging message carries the identifier of the to-be-paged UE.

10. The non-transitory computer readable medium according to claim 9, wherein the second paging message further comprises dedicated access resource information, so that the to-be-paged UE in the second paging message accesses a network according to the dedicated access resource information.

11. The non-transitory computer readable medium according to claim 9, wherein a maximum bandwidth of a received signal of a first type of UE is a preset value and the operations include sending a paging message of a second type of UE on a scheduling resource within a bandwidth of the preset value to reduce or avoid impact caused by the first type of UE on the second type of UE.

12. The non-transitory computer readable medium according to claim 11, wherein the operations include:

carrying scheduling resource information of the first type of UE by using a physical downlink control channel (PDCCH) of a first downlink control information format, and sending a paging message of the first type of UE on a scheduling resource corresponding to the scheduling resource information of the first type of UE; and carrying scheduling resource information of a second type of UE by using a PDCCH of a second downlink control information format, and sending a paging message of the second type of UE on a scheduling resource corresponding to the scheduling resource information of the second type of UE, wherein a maximum bandwidth of a received signal of the second type of UE is greater than a maximum bandwidth of a received signal of the first type of UE.

* * * * *